United States Patent Office 3,303,038
Patented Feb. 7, 1967

3,303,038
PROCESS OF FORMING COLLAGEN ARTICLES AND DISPERSIONS
Howard B. Klevens, Pittsburgh, Pa., assignor to Ethicon, Inc., Somerville, N.J., a corporation of New Jersey
No Drawing. Filed July 29, 1965, Ser. No. 475,875
10 Claims. (Cl. 106—155)

This invention relates to the preparation of a colagen dispersion and the manufacture of formed collagen articles and particularly to an article of formed collagen and a process for preparing these dispersions and for forming articles such as edible sausage casings, films, tubes, casings, strands and the like from reconstituted collagen and is a continuation-in-part of my co-pending application, Serial No. 248,298, filed December 31, 1962; now abandoned. This is an improvement on application Serial No. 814,733, now U.S. Patent No. 3,071,477.

Collagen, as a naturally occurring material found in hides, bones, tendons and other animal and fish tissues, is substantially insoluble in water, but it is known that it can be rendered soluble in water by various treatments such as elevated temperature, prolonged exposure to acids, alkalis or various salts, and enzymes and bacteria and thereby be partially or completely degraded or denatured to form gelatin or other lower molecular weight polypeptides.

Collagen is a proteinaceous material which in its native state is associated with numerous other substances such as keratin, hair, elastin, mucin, reticulin, some lipids, and insoluble bound cations. Collagen in order to be useful must be separated from some of these associated materials before it can become useful in the manufacture of formed collagen articles having desirable properties.

The prior art has only recently recognized the necessity for removal of all or a portion of these non-collagenous substances, but in most cases this has not resulted in reconstituted articles with high wet strengths. For example, in one prior technique, the tissue was initially swollen in two to five percent acetic acid, then blended, as in a Waring Blendor, centrifuged, precipitated with ammonium hydroxide, washed, swollen again in acid, and then extruded (T. P. Salo, U.S. Patent 2,598,-608). In a very similar technique, this entire process is essentially duplicated except that in place of blending, as by a Waring Blendor, the 2.5–5.0% acetic acid swollen collagen tissue is stirred, then diluted about five to six fold, then filtered before being neutralized by ammonium hydroxide, and then swollen in 0.6% malonic acid (E. R. Lieberman and I. B. Oneson, Canadian Patent 620,742). This last technique also duplicates a surgical sponge preparation in which tendons are sliced, swollen in 2.5% acetic acid, precipitated out by ammonium hydroxide, then swollen again in 0.6% malonic acid (R. H. Siffered and R. J. Schmitt, U.S. Patent 2,610,625). In another technique, the collagen tissue was initally swollen in acid, then coagulated and dehydrated, then alkali swollen under stress (J. P. Hollihan, Jr., U.S. Patent 2,461,602). In still another technique, a dilute acid, for example 2.5% lactic acid, is used to initially swell the collagen tissue, then the collagen fibers are tweezed out of the swollen tissue by mechanical means, and homogenized, after which additional acid, for example 0.5% lactic acid is added, before further homogenization and extrusion (W. Schulte, U.S. Patent 2,039,262). A still different process provides that the collagen tissue be treated in an alkaline medium, about pH 13, followed by acid treatment in the pH 2.5–4.0 range (Braun, U.S. Patent 2,852,812).

In Sharp Patent 1,999,641, tendons are shredded and then carded, are defatted with organic solvents, then treated with enzymes such as lipase and tryspin at alkaline pH and then further cleaned with neutralizing agents such as sodium carbonate. A number of other techniques involve the pretreatment of various collagen containing tissue with yeast or yeast cultures or enzymes extracted from yeast followed by acid swelling (E. Rapkin, U.S. Patent 2,740,744; A. L. Lolli, U.S. Patents 2,746,949; 2,746,950; H. L. Keil, A. L. Lolli and E. F. Cavanaugh, U.S. Patent 2,751,377). It is reported that yeast and some enzyme preparations from yeast show keratinase as well as elastase activity (H. L. Keil). A number of other techniques involve the pretreatment of sliced tendon with enzyme preparations which show elastase activity, then with a chelating agent such as the tetrasodium salt of ethylenediaminetetraacetic acid to remove soluble proteins and lipids, and then with an acid in the preferred pH range of two to three (H. B. Klevens and J. Nichols, U.S. Patent 2,919,998; T. L. Reissmann and J. Nichols, U.S. Patent 2,919,999; H. R. Hochstadt and E. R. Lieberman, U.S. Patent 2,920,000).

Only a few of the most recent of the pretreatment, swelling, processing and extrusion methods mentioned above will result in reconstituted collagen articles having desirable or required properties such as wet strength. These essentially involve those pretreatments in which the enzyme systems had essentially no collagenase activity and primarily showed activity towards elastin and possibly mucin, followed by further treatments which assisted in the release of soluble proteins and lipids.

A much simpler single pretreatment step is described here which essentially involves the treatment of collagen which has not been previously treated with added enzymes with dilute solutions of various non-ionic detergents and sequestering agents. By means of this pretreatment, the concentration of lipid material and of calcium in the sliced or shredded collagen tissue is reduced and much of the soluble protein is extracted. The collagen tissue, after this pretreatment, can be treated with various swelling solutions under carefully controlled conditions of pH, temperature, time, manner of homogenization, extrusion and coagulating and/or dehydrating. Under these conditions, reconstituted collagen articles can be formed exhibiting high wet and dry tensile strengths as well as other desirable properties. Various other known adjuncts, e.g. various soluble polymeric materials and various fibers, may be added to the dispersion to impart desirable characteristics to the film. It is also possible to simply extrude and dry the film to produce a product of desirable character without the use of added coagulating agents. This treatment can be applied as a pretreatment step for any of the known methods of producing collagen dispersions and collagen films. It is, however, important that the conditions outlined in application Serial No. 814,773 be observed if the full benefit of this invention is to be achieved and the most satisfactory product obtained.

In application Serial No. 814,773 it is disclosed that the preferred process of forming a film of reconstituted collagen comprises the steps of cutting the collagen source material into finely divided pieces, treating said pieces with a solubilizing agent for calcium and other bound ions and releasing lipids, non-collagenous proteins and non-collagenous impurities from the collagen, separating the collagen mass from the released non-collagenous impurities, subjecting the remaining collagen mass to a swelling treatment in the presence of a swelling agent, shearing and homogenizing the swollen mass, controlling the temperature below about 25° C. until the swelling agent is neutralized in a subsequent dehydration step and the concentration and duration of the swelling operation so that the collagen retains its native axial periodicity, and there is little increase in amorphous material over that found in the original tissue and its diameter does not increase more than about 15% over that of the native collagen from which it was produced, extruding the mass into a hydrating and coagulating bath, carrying the coagulated mass into a tanning bath and drying following tanning by gradually increasing the temperature as the water content of the collagen drops. The disclosure of application Serial No. 814,773 is accordingly incorporated herein by reference in order that one desiring to achieve the most satisfactory product may take advantage of the knowledge therein set forth.

The minor components present in various collagen containing tissue are imbedded and bound in some not well understood manner in the collagen matrix. In the case of a satisfactory enzyme pretreatment, there is a preferential attack on elastin, and a subsequent release of various soluble proteins, polypeptides and some lipids occurs on further pretreatment. If the calcium and/or lipid material in the collagen tissue are involved in the bonding of collagen with collagen and collagen with other fibrous proteins such as elastin and reticulin, a partial or total release of the calcium and lipid by methods described herein would allow for better control of the collagen swelling by acid.

It is well established that anionic detergents will tend to denature most proteins. Some globular proteins are rendered insoluble by the action of anionic detergents. These denatured proteins can become soluble again by removal of the bound detergent anions but differences, such as in electrophoretic mobility or immunochemical reactions, indicate the reformed protein molecule is not identical with the original native protein. Treatment of collagenous tissue with anionic detergents shows that some degradation or denaturation of the fibrous protein also occurs. When hide is treated with as little as 0.1 N sodium dodecylsulfate or low molecular weight alkylnaphthalene sulfonic acid, there is a decrease in shrinkage temperature, $T_s$, of hide from 65° C. to about 47° C. and a marked swelling. (K. H. Gustavson, J. Am. Leather Chem. Assn. 45, 789, 1950; Acta Chem. Scand. 4, 1171, 1950.) The action of cationic detergents, on the other hand, is not as severe as that of the anionic surfactants but it is extremely difficult to remove these cationic surfactants from protein solutions or suspensions.

On the other hand, the action of non-ionic detergents with proteins can be considered to be only one of adsorption, involving at the very most only a polar-polar group type of interaction with only a very weak bonding force. In dilute solutions of non-ionic detergents, there will be an equilibrium between adsorbed and non-adsorbed molecules with the major concentration of detergent molecules remaining in solution. This type of detergent molecule can be very easily removed from the collagen tissue by dilution, washing, etc. Treatment of beef tendon slices and various mammalian skins with solutions of a number of non-ionic detergents results in essentially no decerease in $T_s$ and no swelling.

Pretreatment of collagen source material such, as animal skin or tendon, from which adhering hair, fat sheath and the like refuse have been removed either manually or mechanically, with dilute solutions of a sequestering agent, such as the tetrasodium salt of ethylenediaminetetraacetic acid (EDTA), adjusted to a neutral pH will result in the removal of a portion of the calcium and a small amount of lipid material. At concentrations below 0.1% EDTA, depending on the pH of the solution, about ten to fifteen percent of the total calcium and a much smaller amount of the total extractable lipid may be removed. There is a simultaneous solubilization of small amounts of protein material.

When this pretreatment solution is composed of one of a number of non-ionic detergents at concentrations below one percent and EDTA of about the same composition as above, there is almost twice as much or more calcium removed from the collagen tissue and a higher proportion of lipid material is solubilized. There is little or no change in $T_s$ and essentially no swelling of the hide or tendon slices.

After this dilute non-ionic detergent, EDTA solution at a pH where little or no swelling of the collagen occurs, such as at or near neutral pH, is used as a pretreatment bath for tendon or hide slices or thin strips from other collagen containing tissue, the residual collagen is washed to remove the pretreatment chemicals, the calcium, lipids and soluble proteins released by the tissue. The washed, sliced collagen is next reacted with a swelling agent such as an acid or a peptizing agent for a short controlled period of time so as to produce a carefully limited degree of swelling at carefully controlled temperatures.

This pretreatment produces suitable uniformly swollen and homogenized dispersions at initial acid concentrations and in the preferred pH range of 2.5 to 3.5 and with percentage solids which depend to a large degree on the homogenizing equipment. Dispersions with collagen concentrations as high as 3.5–4.0% have been prepared using equipment made with stainless steel tubing and fittings rated to withstand pressures not much higher than 150–200 p.s.i. The equipment has, however, been used for short periods at pressures as high as 300 to 400 p.s.i. about the range of pressures developed in processing of these higher concentration dispersions. For higher solids, it probably would be necessary to use heavier walled equipment and fittings which have higher ratings.

Preferably the temperature is maintained at about 5° to 15° C. and not allowed to rise above about 25° C. and the swelling time is preferably kept as short as possible. We have found with many dispersions that this swelling time can be cut down to an hour or less. Gentle stirring should accompany this processing step to decrease as much as possible the clumping of partially swollen collagen particles.

This short swelling period is followed by homogenization which may be accomplished in many ways as long as some shear is applied to fibrillate and homogenize the swollen sliced collagen and local heating or overheating, and resultant degradation, does not occur.

With suitable precautions no air will be entrapped in the dispersion system during processing, but if the system has entrained air during processing this should be removed by evacuation or by other suitable means.

Finally the homogenized, uniformly swollen dispersion is extruded through a suitable orifice, depending on the shape and characteristics desired in the final film, tubing or fiber. The dispersion is extruded into a liquid capable of dehydrating and/or precipitating the dispersion. For this purpose concentrated solutions of salts such as ammonium sulfate may be used. However, optimum results have been obtained using acetone containing sufficient alkali such as ammonia or ethanolamine to neutralize any residual acid.

The term HLB, the hydrophile-lipophile balance, indicates the size and strength of the hydrophilic and lipophilic groups that form the molecule of the surface active agent. A high HLB (about 13–17) indicates that the polar portion of the surfactant molecule is large enough to pull the hydrocarbon portion of the molecule into the water phase; a low HLB value (below 10) indicates that the polar portion is not large enough or strong enough to pull the hydrocarbon portion into the water phase; and an intermediate HLB value (about 10–11) indicates that the attraction of the polar portion of the molecule towards water is essentially balanced by the attraction of the hydrocarbon portion of the molecule towards the oil layer. The HLB value is a better means of characterizing various surfactants particularly the non-ionics of markedly different structures, than is the surface tension, the interfacial tension or the critical micelle concentration.

The process of this invention may perhaps be better understood by reference to the following examples.

EXAMPLE I

The soft portions of beef tendon, the deep flexor and superficial flexor tendons, preferably obtained from freshly killed steers but salted or frozen tendon may also be used, were stripped of their outer sheaths and trimmed free of fat and other extraneous tissues. These soft portions were then washed thoroughly in cold water to remove soluble impurities, and then were frozen to assist in slicing. Transverse slices, of the order of 0.7 to 0.8 mm., were soaked in a solution of 0.025% tetrasodium salt of ethylenediaminetetraacetic acid and 0.1% polyoxyethylene sorbitan monolaurate (HLB 16.7), adjusted to pH 7.1 at room temperature for four hours. For one hundred parts by weight of tendon, on a dry weight basis, about one thousand parts of the above solution was used.

These pretreated and washed tendon slices were coarsely ground and placed into 4000 ml. of lactic acid solution at a pH of 3.40 at 10° C. After sixty minutes of gentle stirring, the uniformly swollen suspension was homogenized by repeated passage between cooled serrated rolls in an enclosed continuous system. After circulation through these rolls and passage through a series of classified jets for about sixty minutes the pressure on the high pressure side of the jets remained constant at 250 p.s.i., indicating essentially complete homogenization. The pH of the dispersion was 3.95 and total solids was 2.30%.

The collagen dispersion was extruded into a coagulating and dehydrating bath through an annular nozzle so constructed that a section of the internal portion of the nozzle rotated. This is done so that the revolving portion of the nozzle produces a partial displacement or deorientation of the collagen fibrils so as to arrange the fibrils in intercrossing directions.

The moisture content of the collagen film decreased to less than forty percent after passage through the dehydrating bath. The film was subjected to air blown over it with gradual increase in air temperature to about 40° to 45° C. to assist in further evaporation of volatile liquids.

A stretching of about ten percent to twelve percent was applied to the collagen film during the drying stages. The latter drying stage involves blowing progressively hotter air over the casing until a temperature of 70° to 75° C. is reached.

During various steps in the above processing, samples were withdrawn to measure any possible degradation of the collagen. Films were prepared by squeezing the dispersions between various plastic films and dehydrating or coagulating the uniformly thick dispersion in acetone containing about two percent ammonium hydroxide. These films were mounted on hoops, air dried and then oven dried at 75° C. for five to ten minutes.

Shrinkage temperatures of rewet samples were 62±1° C. and the tensile strength of rewet samples was 1400 to 1500 p.s.i.

EXAMPLE II

The tendon slices were treated initially as in Example I except that the pretreatment solution was composed of 0.1% polyoxyethylene (16) esters of unsaturated fatty acids and resin acids (HLB 13.5) and 0.025% tetrasodium salt of ethylenediaminetetraacetic acid, adjusted to pH 7.13. The swelling acid was lactic acid at a pH of 3.45. The pH of the final dispersion was 4.15. Solids content was 2.45%.

Shrinkage temperature of the reconstituted film was 63° C. and the tensile strength of rewet samples were 1350–1400 p.s.i.

EXAMPLE III

The tendon slices were treated initially as in Example I except that the pretreatment solution was composed of 0.1% of an equal mixture of polyoxyethylene (16) esters of unsaturated fatty acids and resin acids (HLB 13.5) and urea and 0.025% tetrasodium salt of ethylenediamintetraacetic acid adjusted to pH 7.3. The swelling acid was lactic acid at an initial pH of 3.40. The pH of the final dispersion was 4.0. Solids content was 2.37%.

Shrinkage temperature of the reconstituted film was 61° C. and the tensile strength of rewet samples was about 1350 p.s.i.

EXAMPLE IV

The tendon slices were treated initially as in Example I except that the pretreatment solution was composed of 0.1% polyoxyethylene (12) ether of a branched chain alcohol (HLB 14.5) and 0.025% tetrasodium salt of ethylenediaminetetraacetic acid (EDTA) adjusted to pH 7.2. The swelling acid was lactic acid at an initial pH of 3.45. The pH of the final dispersion was 4.05. Solids content was 2.28%.

Shrinkage temperature of reconstituted film was 62° C. and the tensile strength of rewet samples was about 800 p.s.i.

EXAMPLE V

Tendon slices were treated initially as in Example I except that the pretreatment solution was composed of 0.1% of an equal mixture of a polyoxyethylene (12) ether of a branched chemical alcolol (HLB 14.5) and urea and 0.025% EDTA adjusted to pH 7.2. The swelling acid was lactic acid at an initial pH of 3.42. The pH of the final dispersion was 3.95. The solids content was 2.38%.

Shrinkage temperature of the reconstituted collagen film was 62° C. and the tensile strength was about 850 p.s.i.

EXAMPLE VI

Tendon slices were treated as in Example I except that the pretreatment solution was composed of 0.1% ether from 5 ethylene oxide and nonly phenol (HLB 10) and 0.025% EDTA adjusted to pH 7.15. The swelling acid was lactic acid at pH 3.38. The final pH of the dispersion was 3.85.

The shrinkage temperature of the reconstituted collagen film was 55° C. and the wet tensile strength 500 p.s.i.

EXAMPLE VII

Tendon slices were treated as in Example I except that the pretreatment solution was composed of 0.1% ether from 10 ethylene oxide and nonyl phenol (HLB 13.3) and 0.025% EDTA adjusted to pH 7.2. The swelling acid was lactic acid at a pH of 3.41. The pH of the final dispersion was 3.92.

The shrinkage temperature of the reconstituted collagen film was 61–62° C. The wet tensile strength was 750 p.s.i.

EXAMPLE VIII

Tendon slices were treated as in Example I except that the pretreatment solution was composed of 0.1% ether from 6 ethylene oxide and nonyl phenol (HLB 10.9) and 0.025% EDTA adjusted to a pH of 7.2. The swelling acid was lactic acid at an initial pH of 3.35. The pH of the final dispersion was 3.87.

Shrinkage temperature of the reconstituted collagen film was 53° C. The wet tensile strength was 300 p.s.i.

EXAMPLE IX

Tendon slices were treated as in Example I except that the pretreatment solution was composed of 0.1% ether from 9 ethylene oxide and nonyl phenol (HLB 13.0) and 0.025% EDTA adjusted to a pH of 7.3. The swelling acid was lactic acid at an initial pH of 3.40. The pH of the final dispersion was 3.95.

Shrinkage temperature of the reconstituted collagen film was 60° C. and the wet tensile strength was 650 p.s.i.

EXAMPLE X

Tendon slices were treated as in Example I except that the pretreatment solution was composed of 0.5% potassium myristate and 0.025% EDTA adjusted to a pH of 7.3. The swelling acid was lactic acid at an initial pH of 3.45. The pH of the final dispersion was 3.85.

The shrinkage temperature of the reconstituted collagen film was 55° C. and the wet tensile strength was 350–400 p.s.i.

EXAMPLE XI

Tendon slices were treated as in Example I except that the pretreatment solution was composed of 0.5% sodium dodecyl benzene sulfonate and 0.025% EDTA adjusted to a pH of 7.25. The swelling acid was lactic acid at an initial pH of 3.41. The pH of the final dispersion was 3.70.

The shrinkage temperature of the reconstituted collagen film was 52–53° C. and the wet tensile strength was 350–400 p.s.i.

EXAMPLE XII

Tendon slices were treated as in Example I except that the pretreatment solution was composed of 0.5% sodium dodecylbenzene sulfonate plus sodium sulfate and 0.025% EDTA adjusted to pH 7.20. The swelling agent was lactic acid at an initial pH of 3.45. The pH of the final dispersion was 3.75.

The shrinkage temperature of the reconstituted collagen film was 55° C. and the wet tensile strength was 500 p.s.i.

EXAMPLE XIII

Tendon slices were treated as in Example I except that the pretreatment solution was composed of 0.5% sodium N-substituted N-fatty acid taurate and 0.025% EDTA at an adjusted pH of 7.25. The swelling acid was lactic acid at an initial pH of 3.40. The pH of the final dispersion was 3.85.

The reconstituted collagen film had a shrinkage temperature of 53° C. and a wet tensile strength of 450 p.s.i.

EXAMPLE XIV

Tendon slices were treated as in Example I except that the pretreatment solution was composed of 0.5% cetyl pyridinium chloride and 0.025% EDTA adjusted to a pH of 7.30. The swelling acid was lactic acid at an initial pH of 3.45. The pH of the final dispersion was 3.90.

The shrinkage temperature of the reconstituted collagen film was 53° C. and the wet tensile strength was 300 p.s.i.

EXAMPLE XV

The hair and excess fat were carefully cut from frozen sections of steer hide by means of a leather splitter. The dehaired, defatted hide was washed thoroughly, frozen and sliced into approximately 1.0 mm. thick strips. Based on dry weight, 100 gm. of the sliced hide was soaked in about 1000 ml. of a solution of 0.1% polyoxyethylene (16) esters of unsaturated fatty acids and resin acids (HLB 13.5) and 0.025% tetrasodium salt of ethylenediaminetetraacetic acid, adjusted to pH 7.1, for three to four hours.

The pretreated hide slices were washed thoroughly, coarsely ground, and placed into three liters of lactic acid solution at a pH of 3.4 at about 10° C. The acid swollen hide and the excess acid solution were passed through the homogenization apparatus for about two hours or until the pressure on the high pressure side of the jets remained constant. The pH of the dispersion was 4.05 and the total solids were 3.15%.

The character of the homogenized collagen dispersion prepared from dehaired hide was quite different from that prepared from the soft section of beef tendon. The latter was very viscous, tenuous and appeared to have some degree of internal continuity as when flowing. The dispersion from hide was quite doughlike, viscous, and would keep its shape for a relatively long period when formed as in a mound. The behavior of both dispersions under extrusion, dehydrating and/or coagulating were quite similar, however.

Treatment following film forming was essentially that used for the tendon dispersions. Shrinkage temperature of rewet samples was 62–63° C. and the wet tensile strength was in the range of 1050–1150 p.s.i.

EXAMPLE XVI

Hide slices were treated an in Example V except that the pretreatment solution was composed of 0.1% of a polyoxyethylene (12) ether of a branched chain alcohol (HLB 14.5) and 0.025% EDTA adjusted to pH 7.15. The swelling acid was lactic acid at an initial pH of 3.45. The pH of the final dispersion was 3.98.

The shrinkage temperature of the reconstituted collagen film was 61–62° C. and the wet tensile strength 950–1050 p.s.i.

EXAMPLE XVII

Hide slices were treated as in Example VIII but with lactic acid at an initial pH of 3.40 and a pH of 3.93 for the final dispersion.

The shrinkage temperature of the reconstituted film was 52° C. and the wet tensile strength was 275 p.s.i.

EXAMPLE XVIII

Hide slices were treated as in Example X but with lactic acid at an initial pH of 3.49 and a pH in the final dispersion of 3.93.

The shrinkage temperature of the reconstituted film was 50° C. and the wet tensile strength was 225–250 p.s.i.

In the foregoing examples only the detergent has been changed, lactic acid being used in all cases as the swelling agent. Similar results are achieved with other detergents and other concentrations as well as with other swelling acids as for example acetic, hydroxyacetic, cyanoacetic, etc.

EXAMPLE XIX

Tendon slices were treated as in Example II but with acetic acid at an initial pH of 3.15 in place of lactic acid and with a pH of 3.90 in the final dispersion.

The shrinkage temperature of the reconstituted collagen film was 61° C. and the wet tensile strength was 1400–1500 p.s.i.

EXAMPLE XX

Tendon slices were treated as in Example IV except that acetic acid at an initial pH of 3.20 was substituted for the lactic acid and the pH of the final dispersion was 3.97.

The shrinkage temperature of the reconstituted collagen film was 60° C. and the wet tensile strength was 900 p.s.i.

EXAMPLE XXI

Tendon slices were treated as in Example X except that acetic acid at an initial pH of 3.22 was substituted for lactic acid and the pH of the final dispersion was 3.85.

The shrinkage temperature of the reconstituted collagen film was 52° C. and the wet tensile strength was 400 p.s.i.

EXAMPLE XXII

Tendon slices were treated as in Example II except that cyanoacetic acid at an initial pH of 3.43 was substituted for lactic acid. The pH of the final dispersion was 3.95.

The shrinkage temperature of the reconstituted collagen film was 62° C. and the wet tensile strength was 1500 p.s.i.

EXAMPLE XXIII

Tendon slices were treated as in Example X except that cyanoacetic acid at an initial pH of 3.40 was substituted for lactic acid and the pH of the final dispersion was 3.92.

The shrinkage temperature of the reconstituted collagen film was 54° C. and the wet tensile strength was 400–450 p.s.i.

EXAMPLE XXIV

Tendon slices were treated as in Example II except hydroxyacetic acid at an initial pH of 3.30 was substituted for lactic acid. The pH of the final dispersion was 4.02.

The shrinkage temperature of the reconstituted collagen film was 59° C. and the wet tensile strength was 1300 p.s.i.

EXAMPLE XXV

Tendon slices were treated as in Example X except hydroxyacetic acid at an initial pH of 3.41 was substituted for lactic acid. The pH of the final dispersion was 3.90.

The shrinkage temperature of the reconstituted collagen film was 53° C. and the wet tensile strength 400 p.s.i.

In the foregoing examples, no tanning agents or plasticizers or other treating agents commonly used to produce a final sausage casing or film were used. The test data is all based upon identical conditions of preparation for comparative purposes and does not represent the final strengths to be obtained if the film were treated with plasticizers, tanning agents and the like. Such treatments are well known and are described in part in my copending applicaiton Serial No. 814,773 and in various issued patents and publications.

While I have set out certain preferred practices and embodiments of my invention in the foregoing specification, it will be understood that the invention may be otherwise embodied within the scope of the following claims.

I claim:

1. In a process of forming a dispersion of collagen from small pieces of collagen without contacting the same with an enzyme the steps of treating the pieces of collagen with a non-ionic detergent and a solubilizing agent for calcium and bound ions, removing the detergent from the collagen and swelling the collagen to form a dispersion thereof.

2. In the process of forming a dispersion of collagen from small pieces thereof without contacting the same with an enzyme the steps comprising treating the pieces of collagen with a non-ionic detergent having an HLB in excess of 12 removing the detergent from the collegan and swelling the collegan to form a dispersion thereof.

3. In the process of forming a dispersion of collegan from small pieces thereof without contacting the same with an enzyme the steps comprising treating the pieces of collagen with a non-ionic detergent having an HLB between about 13 and 17 removing the detergent from the collagen and swelling the collagen to form a dispersion thereof.

4. The process of forming a dispersion of reconstituted collagen without contacting the same with an enzyme comprising the steps of cutting collagen source material into small pieces capable of being swollen by a swelling agent, treating said cut untreated pieces with a non-ionic detergent, separating the collagen from the detergent and subjecting the collagen to a swelling treatment in the presence of a swelling agent at a temperature below about 25° C.

5. The process of forming a film of reconstituted collagen without contacting the same with an enzyme comprising the steps of cutting collagen source material into small pieces capable of being swollen by a swelling agent, treating said cut untreated pieces with a non-ionic detergent, separating the collagen from the detergent and subjecting the collagen to a swelling treatment in the presence of a swelling agent at a temperature below about 25° C., and extruding the mass and drying.

6. The process of forming a film of reconstituted collagen without contacting the same with an enzyme comprising the steps of cutting the collagen source material into pieces one of whose dimensions does not exceed about 50 mils, treating said cut untreated pieces with a non-ionic detergent and a solubilizing agent for calcium and other bound ions and releasing calcium, bound ions, lipids, non-collagenous proteins and non-collegenous impurities from the collagen, separating the collagen mass from the released non-collagenous impurities, shredding the collagen pieces so treated, subjecting the remaining collagen mass to a swelling treatment in the presence of a swelling agent, shearing and homogenizing the swollen mass, controlling the temperature below about 25° C. and swelling agent concentration and duration of the swelling operation so that upon extruding, drying or tanning the collagen maintains a thermal shrinkage temperature within about ten degrees of the source material, extruding the mass into a dehydrating bath, carrying the coagulated mass into a tanning bath and drying following tanning by gradually increasing the temperature as the water content of the collagen drops.

7. The process of forming a film of reconstituted collagen without contacting the same with an enzyme comprising the steps of cutting the collagen source material into pieces, treating said cut untreated pieces with a mixture of a non-ionic detergent having an HLB in excess of 12 and a solubilizing agent for calcium and other bound ions and releasing calcium, bound ions, lipids, non-collagenous proteins and non-collagenous impurities from the collagen, separating the collagen mass from the released non-collagenous impurities, shredding the collagenous pieces so treated, subjecting the remaining collagen mass to a swelling treatment in the presence of a swelling agent, shearing and homogenizing the swollen mass, controlling the temperature below about 25° C. and the swelling agent concentration and duration of the swelling operation so that upon extruding, drying or tanning the collagen maintains a thermal shrinkage temperature within about ten degrees of the source material, extruding the mass into a dehydrating bath, carrying the coagulated mass into a tanning bath and drying following tanning by gradually increasing the temperature as the water content of the collagen drops.

8. The process of forming a film of reconstituted collagen without contacting the same with an enzyme comprising the steps of cutting the collagen source material into pieces, treating said cut untreated pieces with a mixture of a non-ionic detergent having an HLB between about 13 and 17 and a solubilizing agent for calcium and other bound ions and releasing calcium, bound ions, lipids, non-collagenous proteins and non-collagenous impurities from the collagen, separating the collagen mass from the released non-collagenous impurities, shredding the collagen pieces so treated, subjecting the remaining collagen mass to a swelling treatment in the presence of a swelling agent, shearing and homogenizing the swollen mass, controlling the temperature below about 25° C. and the swelling agent concentration and duration of the swelling operation so that upon extruding, drying or tanning the collagen maintains a thermal shrinkage temperature within about ten degrees of the source material, extruding the mass into a dehydrating and coagulating bath, carrying the coagulated mass into a tanning bath and drying following tanning by gradually increasing the temperature as the water content of the collagen drops.

9. The process of forming a film of reconstituted collagen without contacting the same with an enzyme comprising the steps of cutting the collagen source material into pieces one of whose dimensions does not exceed about 50 mils, treating said cut untreated pieces with a non-ionic detergent, separating the collagen mass from the detergent, shredding the collagen pieces so treated, subjecting the remaining collagen mass to a swelling treatment in the presence of a swelling agent, shearing and homogenizing the swollen mass, controlling the temperature below about 25° C. until the swelling agent is neutralized in a subsequent dehydration step and the concentration and duration of the swelling operation so that upon extruding, drying or tanning the thermal shrinkage temperature of the collagen remains within about ten degrees of the source material, extruding the mass into a dehydrating and coagulating bath, carrying the coagulated mass into a tanning bath and drying following tanning by gradually increasing the temperature as the water content of the collagen drops.

10. The process of forming a film of reconstituted collagen without contacting the same with an enzyme comprising the steps of cutting the collagen source material which have not been previously treated with added enzymes into pieces one of whose dimensions does not exceed about 50 mils, treating said cut untreated pieces with a non-ionic detergent, separating the collagen mass from the detergent impurities, shredding the collagenous pieces so treated, subjecting the remaining collagen mass to a swelling treatment in the presence of a swelling agent, shearing and homogenizing the swollen mass, controlling the temperature below about 25° C. until the swelling agent is neutralized in a subsequent dehydration step and the concentration and duration of the swelling operation so that upon extruding, drying or tanning the thermal shrinkage temperature of the collagen when formed, dehydrated and stretched remains within about ten degrees of the source material, extruding and dehydrating the mass, carrying the dehydrated mass into a tanning bath and drying following tanning by gradually increasing the temperature as the water content of the collagen drops.

References Cited by the Examiner
UNITED STATES PATENTS

| | | | |
|---|---|---|---|
| 2,919,998 | 1/1960 | Klevens et al. | 106—161 |
| 2,992,882 | 7/1961 | Besso et al. | 264—202 |
| 3,071,477 | 1/1963 | Klevens | 99—176 |

A. LOUIS MONACELL, *Primary Examiner.*

L. M. SHAPIRO, *Assistant Examiner.*

UNITED STATES PATENT OFFICE
CERTIFICATE OF CORRECTION

Patent No. 3,303,038　　　　　　　　　　　　　　February 7, 1967

Howard B. Klevens

It is hereby certified that error appears in the above numbered patent requiring correction and that the said Letters Patent should read as corrected below.

Column 2, line 2, for "tryspin" read -- trypsin --; line 8, for "2,740,744" read -- 2,740,774 --; column 3, line 6, for "hydrating" read -- dehydrating --; column 6, line 43, for "nonly" read -- nonyl --; column 8, line 14, for "an" read -- as --; same line 14, for "Example V" read -- Example XV --; column 9, lines 51 and 52, and line 53, for "collegan", each occurrence, read -- collagen --; column 11, lines 17 and 18, strike out "which have not been previously treated with added enzymes".

Signed and sealed this 17th day of October 1967.

(SEAL)

Attest:

Edward M. Fletcher, Jr.

Attesting Officer

EDWARD J. BRENNER

Commissioner of Patents